United States Patent
Wen et al.

(10) Patent No.: US 8,781,058 B1
(45) Date of Patent: Jul. 15, 2014

(54) NUCLEAR POWER PLANT STEEL DETECTING DEVICE

(75) Inventors: Tung-Jen Wen, Zhudong Township (TW); Ning-Yih Hsu, Keelung (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 1225 days.

(21) Appl. No.: 12/896,038

(22) Filed: Oct. 1, 2010

(51) Int. Cl.
*G21C 9/00* (2006.01)
*G21C 17/00* (2006.01)

(52) U.S. Cl.
CPC .............. *G21C 14/022* (2013.01); *G21C 17/00* (2013.01)
USPC ............ 376/305; 376/245; 376/259; 376/277

(58) Field of Classification Search
CPC ...... G21C 17/00; G21C 17/017; G21C 17/02; G21C 17/022–17/038
USPC .................. 376/245, 249, 259, 277, 305–307
See application file for complete search history.

(56) References Cited

U.S. PATENT DOCUMENTS

| | | | | |
|---|---|---|---|---|
| 4,636,292 A | * | 1/1987 | Fejes et al. | 204/404 |
| 4,831,324 A | * | 5/1989 | Asakura et al. | 324/615 |
| 5,260,218 A | * | 11/1993 | Garde | 436/6 |
| 5,579,354 A | * | 11/1996 | Sakai et al. | 376/245 |
| 5,625,656 A | * | 4/1997 | Hettiarachchi et al. | 376/245 |
| 6,099,718 A | * | 8/2000 | Duthoo et al. | 205/791 |

* cited by examiner

*Primary Examiner* — Jack W Keith
*Assistant Examiner* — Marshall O'Connor
(74) *Attorney, Agent, or Firm* — Jackson IPG PLLC

(57) ABSTRACT

A device for detecting steel is provided. The steel is used in a nuclear plant. The device has a detecting circuit of electrochemical corrosion potential (ECP) and alternative current (AC) impedance. An environment in a boiling water reactor (BWR) is simulated under hydrogen water chemistry (HWC). The environment is used for detecting intergranular stress corrosion cracking (IGSCC) of components coated with different precious metals. Thus, effect of coating different precious metals on steels can be evaluated for HWC.

20 Claims, 1 Drawing Sheet

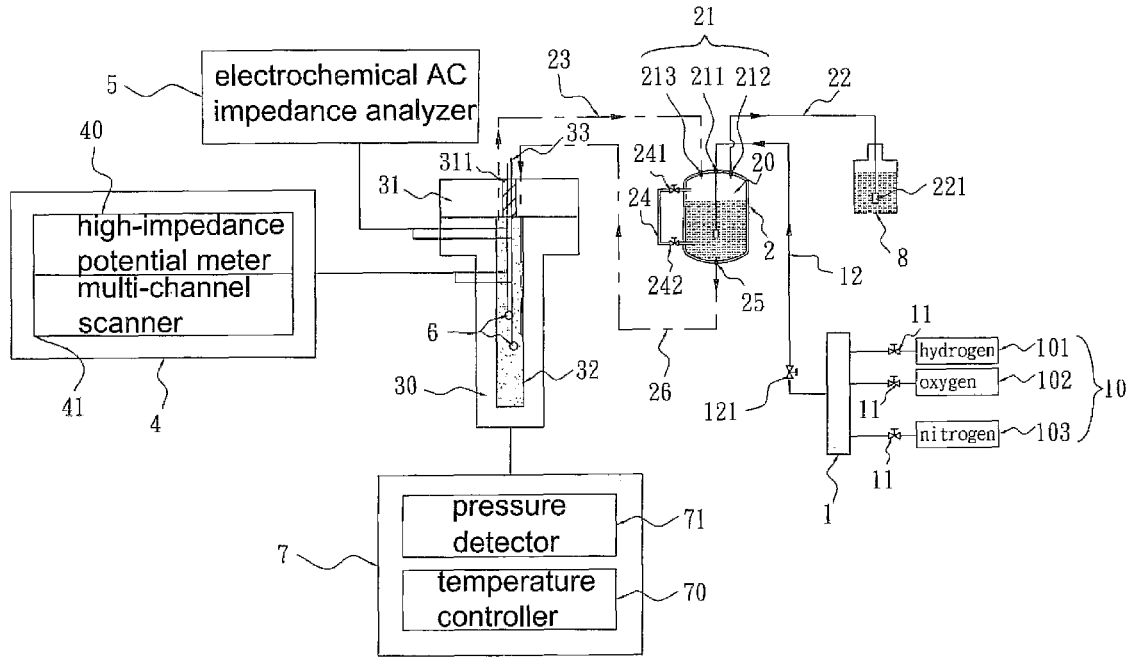

U.S. Patent    Jul. 15, 2014    US 8,781,058 B1

NUCLEAR POWER PLANT STEEL DETECTING DEVICE

TECHNICAL FIELD OF THE DISCLOSURE

The present disclosure relates to steel detection; more particularly, relates to using nuclear power plant water chemistry to simulate a detecting circuit of electrochemical corrosion potential (ECP) and alternative-current (AC) impedance for acquiring effect of preventing intergranular stress corrosion cracking (IGSCC) of boiling water reactor (BWR) by coating internal components with precious metal film through hydrogen water chemistry (HWC).

DESCRIPTION OF THE RELATED ARTS

A boiling water reactor may face IGSCC problem after a long time of operation. What may cause people to be more concerned are the damages happened on internal components of a reactor pressure vessel (RPV), like core shroud, upper plenum and lower plenum, which may cause serious problems to system safety.

Cracking happened in reactor core shroud weld may have the following causes of IGSCC to the reactor pressure vessel: one is residual stress, one is sensitized material and the other is reactor core environment. Since internal components of the RPV can not be easily replaced, IGSCC can be somewhat prohibited by improving water environment in the reactor core. On running the BWR, the reactor core water will generate hydrogen peroxide and oxygen owing to radiolysis of reactor core fuel rods; and then hydrogen peroxide will generate oxygen and water. Thus, the reactor core water becomes highly oxidized. When the BWR is run under normal water chemistry, dissolved oxygen in the reactor core water is about 200 to 400 ppb, where, in a high-temperature pure water, dissolved oxygen is the main cause for corrosion of the internal components of the RPV. For solving the problem, hydrogen water chemistry (HWC) is used by adding hydrogen to feeding water for reacting hydrogen with oxygen or hydrogen peroxide into water to reduce dissolved oxygen in the reactor core water, where dissolved oxygen is kept below 10 ppb to prevent IGSCC. Although HWC can prevent IGSCC and save check and maintenance of the internal components and tubes in the reactor core, gas of N-16 generated may make radiation increase in nuclear power plant during operation and radiation of Co-60 in dry well may also increase after stopping operation.

A metal coating technology has been introduced by GE Co., USA, for solving the problem concerning HWC. A tiny amount of soluble precious metal compound having a concentration of 20~100 ppb is added into reactor core water. A residual heat removal system, (RHRS) uses temperature of the reactor itself to contact internal components of reactor pressure vessel (RPV) with cycling reactor core water for 24 hours. Thus, a precious metal film is coated on surfaces of the components. Through catalysis of the surfaces of the precious metal, like Pt, Rh, etc., to hydrogen, a utility ratio of hydrogen is improved. Furthermore, required amount of hydrogen to be filled is greatly reduced for HWC to protect the internal components of the RPV.

Although HWC is used to improve water chemistry environment for preventing IGSCC of the internal components of the reactor core, radiation dose inside the reactor core has to be 4 to 5 times to that of a normal running BWR when hydrogen is filled to a concentration of 1~2 ppm for reducing high oxidation of the reactor core water in the BWR. Moreover, main steam pipe and nuclear power plant may have too much radiation too. Hence, a detector is required to provide data for evaluating effect of preventing IGSCC of BWR by coating its internal components with precious metal film through HWC.

SUMMARY OF THE DISCLOSURE

The main purpose of the present disclosure is to acquire workability and effect of metal coating technology by simulating a detecting circuit of ECP and AC impedance through nuclear power plant water chemistry.

The second purpose of the present disclosure is to simulate a BWR for acquiring effect of preventing IGSCC by coating internal components of the reactor core with precious metal film through HWC.

To achieve the above purposes, the present disclosure is a nuclear power plant steel detecting device, comprising a gas mixing tube, a hydrogen filling barrel, an autoclave, an ECP analyzer and an electrochemical AC impedance analyzer, where the gas mixing tube comprises a plurality of gas cylinders and a plurality of fine-tuning control valves; where the gas mixing tube has a gas inlet tube between the gas mixing tube and the hydrogen filling barrel to provide gas to the hydrogen filling barrel through the gas inlet tube; where the plurality of gas cylinders comprising a hydrogen gas cylinder, an oxygen gas cylinder and a nitrogen gas cylinder; where each of the gas cylinders has one of the fine-tuning control valves at an end to control gas amount flown through and to be connected with the gas inlet tube through the corresponding one of the fine-tuning control valves; where the hydrogen filling barrel contains a hydrogen water solution; where the hydrogen filling barrel has an enclosed space contained inside; where the hydrogen filling barrel has a depressurizing valve group on a top end to be connected with the enclosed space; where the depressurizing valve group comprises a first depressurizing valve, a second depressurizing valve and a third depressurizing valve; where the first depressurizing valve, the second depressurizing valve and the third depressurizing valve are respectively connected with the gas inlet tube, a first air-releasing tube and a second air-releasing tube; where the hydrogen filling barrel has a water level monitor meter at a side; where the water level monitor meter has an upper valve and a lower valve; where the upper valve and the lower valve are separately connected with the enclosed space; where the hydrogen filling barrel has an outlet valve at an end to be connected with the enclosed space; where the outlet valve is connected with a gas-liquid inlet tube to drain the hydrogen water solution in the enclosed space through the outlet valve and to provide the hydrogen water solution to the autoclave through the gas-liquid inlet tube; where the autoclave simulates an environment of nuclear power plant water chemistry; where the autoclave is sealed by a top cover having an insulated joint; where the autoclave has a containing space within; where the containing space is able to be enclosed; where the containing space is connected with the gas-liquid inlet tube and the second air-releasing tube; where the autoclave has wires contained within to be spot-welded with the to-be-detected steel materials; where the wires penetrates through the insulated joint to reach out of the top cover of the autoclave and to be connected with the ECP analyzer and the electrochemical AC impedance analyzer; where reactants in the autoclave is cycled to be drained out to the hydrogen filling barrel through the second air-releasing tube; where the ECP analyzer has the to-be-detected steel materials as working electrodes to obtain ECPs of the to-be-detected steel materials; where the to-be-detected steel materials is made of stainless steel; where the ECPs of the to-be-detected steel materials is controlled to be not bigger than −0.23V on comparing to a voltage of a standard hydrogen electrode; where the to-be-detected steel materials comprises an uncoated steel, a Pd-coated steel, a Pt-coated steel and an Rh-coated steel; where the electrochemical AC impedance analyzer provides a plurality of AC signals having different frequencies to obtain characteristics of impedances of the to-be-detected steel materials to obtain coating conditions of the to-be-detected steel materials under the environment of nuclear power plant water chemistry to acquire safety of coated films of the to-be-detected steel materials; and where the nuclear power plant steel detecting device obtains a detecting circuit with the above comprised components to simulate a BWR to acquire effect of preventing IGSCC of the BWR with internal components coated with precious metal film under HWC. Accordingly, a novel nuclear power plant steel detecting device is obtained.

BRIEF DESCRIPTIONS OF THE DRAWINGS

The present disclosure will be better understood from the following detailed description of the preferred embodiment according to the present disclosure, taken in conjunction with the accompanying drawing, in which FIG. 1 is the structural view showing the preferred embodiment according to the present disclosure.

DESCRIPTION OF THE PREFERRED EMBODIMENT

The following description of the preferred embodiment is provided to understand the features and the structures of the present disclosure.

Please refer to FIG. 1, which is a structural view showing a preferred embodiment according to the present disclosure. As shown in the FIGURE, the present disclosure is a nuclear power plant steel detecting device, where nuclear power plant water chemistry is used to build a detecting circuit of electrochemical corrosion potential (ECP) and alternative current (AC) impedance; and where the detecting device comprises a gas mixing tube 1, a hydrogen filling barrel 2, an autoclave 3, an ECP analyzer 4 and an electrochemical AC impedance analyzer 5.

The gas mixing tube 1 has a plurality of gas cylinders 10 and a plurality of fine-tuning control valve 11; and has a gas inlet tube 12 between the gas mixing tube 1 and the hydrogen filling barrel 2. A switching valve 121 is set on the gas inlet tube 12 to control switching on and off of channel for providing gas to the hydrogen filling barrel 2 through the gas inlet tube 12. Therein, the plurality of gas cylinders 10 comprises a hydrogen gas cylinder 101, an oxygen gas cylinder 102 and a nitrogen gas cylinder 103. A fine-tuning control valve 11 is set at a front end of each of the gas cylinders 10 to be connected with the gas inlet tube 12 through the corresponding fine-tuning control valve 11.

The hydrogen filling barrel 2 is used to form a hydrogen water solution. The barrel has a volume of 30 liters (L) and is made of SS316 stainless steel welded with an end plate to provide water source of the circuit and to be used as a buffer space for tolerating expansion and contraction of water in the circuit. The hydrogen filling barrel 2 has an enclosed space formed inside; and the hydrogen filling barrel 2 has a depressurizing valve group 21 at a top end to be connected with the enclosed space 20. The depressurizing valve group 21 comprises a first depressurizing valve 211, a second depressurizing valve 212 and a third depressurizing valve 213. The first, second and third depressurizing valves 211,212,213 are separately connected with the gas inlet tube 12, a first air-releasing tube 22 and a second air-releasing tube 23. A water level monitor meter 24 is set at a side of the hydrogen filling barrel 2, which has a upper valve 241 and a lower valve 242 separately connected with the enclosed space 20. At bottom of the hydrogen filling barrel 2, an outlet valve 25 is set to be connected with the enclosed space 20; and is connected with a gas-liquid inlet tube 26. The hydrogen water solution in the enclosed space 20 is drained out through the outlet valve 25 to be provided to the autoclave 3 through the gas-liquid inlet tube 26.

The autoclave 3 simulates an environment of nuclear power plant water chemistry. The autoclave 3 has a furnace body 30 sealed by a top cover 31 having an insulated joint 311. Thus, a containing space 32, which is able to be sealed, is formed within the autoclave 3 and is connected with the gas-liquid inlet tube 26 and the second air-releasing tube 23. Inside the autoclave 3, there are wires 33 for spot-welding the to-be-detected steel materials 6. The wires 33 penetrate through the insulated joint 311 to reach out of the top cover 31 of the autoclave 3 to be connected with the ECP analyzer 4 and the electrochemical AC impedance analyzer 5. Therein, the autoclave 3 simulates the environment of nuclear power plant water chemistry at a pressure of 1050 Psi and a temperature of 288° C., whose inside water environment has a dissolved oxygen amount between 200 and 400 ppb, a dissolved hydrogen amount between 0.1 and 2 ppm, an electrical conductivity not bigger than 0.1 μS/cm and a pH value between 6.5 and 7.3. Reactants in the autoclave 3 are cycled and drained out to the hydrogen filling barrel 2 through the second air-releasing tube 23.

The ECP analyzer 4 uses the to-be-detected steel materials 6 as working electrodes to detect ECP of the to-be-detected steel materials 6. Therein, the to-be-detected steel materials 6 is made of stainless steel, whose ECP is controlled to be not bigger than −0.23V on comparing to a voltage of a standard hydrogen electrode. The to-be-detected steel materials 6 comprise an uncoated steel, an oxidized-film coated steel, a Pd-coated steel, a Pt-coated steel and a Rh-coated steel.

The electrochemical AC impedance analyzer 5 provides AC signals having different frequencies for detecting characteristics of impedances of the to-be-detected steel materials 6 to acquire coating conditions of the to-be-detected steel materials 6 under the environment of nuclear power plant water chemistry. Hence, safety conditions of the to-be-detected steel materials 6 coated with precious metal films are acknowledged. Thus, a novel nuclear power plant steel detecting device is obtained.

The to-be-detected steel materials 6 is made of SS304, including uncoated steel, 304SS-perfilmed, 304-NMCA-800 ppbFe$_2$O3, 304-NMCA-400 ppbFe2O3, 304-NMCA-200 ppbFe2O3, 304-NMCA-NoFe2O3 and six different steels coated with Pd, Pt and Rh. The to-be-detected steel materials 6 are spot-welded with 0.5 φmm wires 33 at rims. The wires 33 are made of stainless steel heated by a blowtorch for being tightly coated with shrinkable insulated tube.

On using the present disclosure, a nuclear power plant using boiling water reactors (BWR) are simulated with a detecting circuit built with the above components. Under an environment of hydrogen water chemistry (HWC) for sensitize 304 steel and steels coated with different precious metals of Pd, Pt and Rh, hydrogen are blown into water to obtain different concentrations of dissolved oxygen and to record ECP values of the coated steels for acquiring effect of preventing intergranular stress corrosion cracking (IGSCC) of the BWR by coating internal components with the precious metal film.

In a first stage, the gas mixing tube 1 and the hydrogen filling barrel 2 are used to adjust amount of dissolved oxygen in water and monitor water quality for simulating high-pressure high-temperature water environment in the reactor core of the BWR on coating oxidized films on the steels. At first, water is filled into the hydrogen filling barrel during a normal operation. Then, nitrogen is transferred to the hydrogen filling barrel 2 by the nitrogen gas cylinder 103 though the gas mixing tube 1 with fine-tuning and depressurizing for blowing out dissolved oxygen in water. Then, the gas cylinders 10 are used to add hydrogen, oxygen and nitrogen into water to reach a dissolved oxygen concentration, a dissolved oxygen concentration, an electrical conductivity and a pH value in water of the hydrogen filling barrel 2 for required water quality for HWC in the BWR. Therein, the high-pressure high-temperature water environment in the reactor core of the BWR comprises a dissolved oxygen amount between 200 and 400 ppb, a dissolved hydrogen amount between 0.1 and 2 ppm, a electrical conductivity not bigger than 0.1 μS/cm and a pH value between 6.5 and 7.3 for processing in the autoclave 3 for 720 hours at a temperature of 288° C., a volume of 2 litters and a pressure of 1050 Psi.

In a second stage, under simulated water environments having different dissolved oxygen amounts while filling hydrogen to different concentrations, the working electrodes are assembled with different steel materials 6 coated with Pd, Pt and Rh (as the above mentioned six steels) to detect and record values of ECP and AC impedance of the uncoated steel, the oxidized-film coated steel, the Pd-coated steel, the Pt-coated steel and the Rh-coated steel under the same water environment. Therein, the ECP values are detected through a two-electrode method by the ECP analyzer 4. Because two reversible half-cell reactions are both happened on a surface of each of the to-be-detected steel materials 6 during redox, the ECP analyzer 4 detects potentials on the surface to obtain a mixed potential as a surface ECP value of each of the to-be-detected steel materials 6. The ECP analyzer 4 connects its positive electrode on each of the to-be-detected steel materials 6 as a working electrode and its negative electrode on a reference electrode (not shown in the FIGURE). Then, the high-impedance potential meter 40 (voltmeter) and the multi-channel scanner 41 (Keithley7001) are connected with the wires 33. An ECP value of each of the to-be-detected steel materials 6 is detected per minute and changes on potentials are digitally outputted to a data processor through RS232 to be recorded.

In addition, for temperature and pressure safety of the detecting circuit, the present disclosure can further comprise a control device 7 connected with the autoclave 3, where the control device 7 comprises a temperature controller 70 and a pressure detector 71. Therein, the temperature controller 70 is used to prevent temperature of the detecting circuit from too high. When the temperature exceeds a first alarm setting of 300° C., a heating power supply is automatically switched off. When the temperature exceeds a second alarm setting of 310° C., the detecting circuit is automatically stopped running. The pressure detector 71 is used to prevent pressure in the detecting circuit from too high. When the pressure exceeds a third alarm setting of 1250 Psi, the detecting circuit is automatically stopped running and the third depressurizing valve 213 releases vapor for depressurizing. When the pressure exceeds a fourth alarm setting of 1300 Psi, the second and the third depressurizing valves 212,213 are both opened to release vapor. Moreover, for safety on filling hydrogen, the present disclosure can further comprises a hydrogen explosion-proof barrel 8 with the first air-releasing tube 22 connected with the hydrogen explosion-proof barrel 8 for detecting concentration of leaked hydrogen. When the concentration of leaked hydrogen exceeds a preset value, alarm is automatically turned on to prevent explosion. Therein, the hydrogen explosion-proof barrel 8 is filled with water to a ¾ water level and an end of the first air-releasing tube 22 is connected with a one-way outlet valve 221 to be inserted into water for safely releasing extra gas out of water surface through a seal principle while the barrel is kept sealed.

Hence, for acquiring workability and effect of metal coating technology, the present disclosure simulates a detecting circuit of ECP and AC impedance built in a BWR to acquire effect of applying precious metal through HWC, where a corrosion environment for different to-be-detected steel materials, including an uncoated steel, an oxidized film steel, a Pd-coated steel, a Pt-coated steel and a Rh-coated steel, is used to simulate BWR water environment and changes of the water after added with hydrogen. An ECP analyzer is used to detect ECP values of the to-be-detected steel materials. Under the simulated BWR water environment, the ECP values of the to-be-detected steel materials each having a dissolved oxygen amount between 200 and 400 ppb are detected; changes on ECP values of the to-be-detected steel materials each having a hydrogen filling concentration between 0.1 and 2 ppm are detected; and changes on ECP values of the to-be-detected steel materials each being coated with precious metal film for reducing the hydrogen filling concentration are detected. The data obtained through detection thus provides important reference on whether to apply precious metal chemistry technology or not.

To sum up, the present disclosure is a nuclear power plant steel detecting device, where nuclear power plant water chemistry is used to simulates a detecting circuit of ECP and AC impedance for acquiring effect of preventing IGSCC of BWR by coating internal components with precious metal film through HWC.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A nuclear power plant steel detecting device, comprising:
   a gas mixing tube;
   a hydrogen filling barrel;
   an autoclave;
   an electrochemical corrosion potential (ECP) analyzer; and
   an electrochemical alternative-current (AC) impedance analyzer;
   said gas mixing tube having a plurality of gas cylinders and a plurality of fine-tuning control valves,
   said gas mixing tube having a gas inlet tube between said gas mixing tube and said hydrogen filling barrel to provide gas to said hydrogen filling barrel through said gas inlet tube,
   said plurality of gas cylinders comprising a hydrogen gas cylinder, an oxygen gas cylinder, and a nitrogen gas cylinder,
   each of said gas cylinders having a corresponding one of said fine-tuning control valves at an end to control gas amount flown through and connected with said gas inlet tube through the corresponding one of said fine-tuning control valves,
   said hydrogen filling barrel obtaining a hydrogen water solution, said hydrogen filling barrel having an enclosed space obtained therewithin, said hydrogen filling barrel having a depressurizing valve group on a top end of the barrel connected with said enclosed space, said depressurizing valve group comprising a first depressurizing valve, a second depressurizing valve, and a third depressurizing valve, said first depressurizing valve, said second depressurizing valve, and said third depressurizing valve being respectively connected with said gas inlet tube, a first air-releasing tube, and a second air-releasing tube, said hydrogen filling barrel having a water level monitor meter, said water level monitor meter having an upper valve and a lower valve, said upper valve and said lower valve being separately connected with said enclosed space, said hydrogen filling barrel having an outlet valve at an end connected with said enclosed space, said outlet valve being connected with a gas-liquid inlet tube to drain said hydrogen water solution in said enclosed space through said outlet valve and to provide said hydrogen water solution to said autoclave through said gas-liquid inlet tube, said autoclave simulating an environment of nuclear power plant water chemistry, said autoclave being sealed by a top cover having an insulated joint, said autoclave having a containing space therewithin, said containing space being able to be enclosed, said containing space being connected with said gas-liquid inlet tube and said second air-releasing tube, said autoclave having wires therewithin spot-welded with to-be-detected steel materials, said wires penetrating through said insulated joint to reach out of said top cover of said autoclave and connected with said ECP analyzer and said electrochemical AC impedance analyzer, reactants in said autoclave being cycled and drained out to said hydrogen filling barrel through said second air-releasing tube, said ECP analyzer having said to-be-detected steel materials as working electrodes to obtain ECPs of said to-be-detected steel materials, said electrochemical AC impedance analyzer providing a plurality of AC signals having different frequencies to obtain characteristics of impedances of said to-be-detected steel materials to obtain coating conditions of said to-be-detected steel materials under said environment of nuclear power plant water chemistry to obtain safety of coated films of said to-be-detected steel materials, wherein said nuclear power plant steel detecting device obtains a detecting circuit with the above comprised components to simulate a boiling water reactor (BWR) under hydrogen water chemistry (HWC) to obtain effect of preventing intergranular stress corrosion cracking (IGSCC) of said BWR by coating internal components of said BWR with precious metal film.

2. The nuclear power plant steel detecting device according to claim 1, wherein said hydrogen filling barrel is made of SS316 stainless steel welded with an end plate.

3. The nuclear power plant steel detecting device according to claim 1, wherein said gas inlet tube has a switching valve to control switching on and off of channel.

4. The nuclear power plant steel detecting device according to claim 1, wherein said nitrogen gas cylinder transfers nitrogen to said hydrogen filling barrel with fine tuning to blow out dissolved oxygen; and wherein hydrogen, oxygen and nitrogen are added into water by using said plurality of gas cylinders to obtain a concentration of dissolved oxygen and a concentration of dissolved hydrogen in water to simulate said environment of nuclear power plant water chemistry.

5. The nuclear power plant steel detecting device according to claim 1, wherein said wires are stainless wires tightly covered with a shrinkable insulated tube through high-temperature heating.

6. The nuclear power plant steel detecting device according to claim 1, wherein said ECP analyzer processes a detection through a two-electrode method.

7. The nuclear power plant steel detecting device according to claim 1, wherein said ECP analyzer uses a potentiometer to detect potentials on a surface of each of said to-be-detected steel materials through two reversible half-cell reactions to obtain a mixed potential to obtain a surface ECP value of each of said to-be-detected steel materials.

8. The nuclear power plant steel detecting device according to claim 1, wherein a positive electrode of said ECP analyzer is connected with one of said to-be-detected steel materials as a working electrode;

wherein a negative electrode of said ECP analyzer is connected with a reference electrode;

wherein a high-impedance potential meter and a multi-channel scanner contained within said ECP analyzer are connected to said wires; and wherein said ECP analyzer automatically detects an ECP value of said one of said to-be-detected steel materials and records potential changes of said one of said to-be-detected steel materials to obtain a potential value of said one of said to-be-detected steel materials.

9. The nuclear power plant steel detecting device according to claim 1, further comprising:

a control device connected with said autoclave to detect temperature and pressure of said detecting circuit to provide safety, said control device comprising a temperature controller and a pressure detector.

10. The nuclear power plant steel detecting device according to claim 9, wherein said temperature controller automatically switches off a heating power supply at a first alarm setting of 300° C.; and wherein said detecting circuit is automatically turned off at a second alarm setting of 310° C.

11. The nuclear power plant steel detecting device according to claim 9, wherein said pressure detector automatically switches off said detecting circuit and opens one depressurizing valve to release vapor at a third alarm setting of 1250 Psi; and wherein said pressure detector automatically opens two depressurizing valve to release vapor at a fourth alarm setting of 1300 Psi.

12. The nuclear power plant steel detecting device according to claim 1, further comprising a hydrogen explosion-proof barrel connected with said first air-releasing tube and detecting concentration of leaked hydrogen in said detecting circuit and automatically alarming to prevent explosion when said concentration of leaked hydrogen is bigger than a preset value.

13. The nuclear power plant steel detecting device according to claim 12,
wherein said hydrogen explosion-proof barrel is filled with water to a ¾ level; and
wherein an end of said first air-releasing tube is connected with a one-way outlet valve and inserted into said water to safely release extra gas out of water surface through a seal principle.

14. The nuclear power plant steel detecting device according to claim 1, wherein said environment of nuclear power plant water chemistry in said autoclave has a pressure of 1050 Psi and a temperature of 288° C.

15. The nuclear power plant steel detecting device according to claim 1, wherein water in said autoclave has a dissolved oxygen amount between 200 and 400 ppb, a dissolved hydrogen amount between 0.1 and 2 ppm, an electrical conductivity smaller than 0.1 μS/cm and a pH value between 6.5 and 7.3.

16. The nuclear power plant steel detecting device according to claim 1, wherein said to-be-detected steel materials are made of stainless steel.

17. The nuclear power plant steel detecting device according to claim 1, wherein said ECPs of said to-be-detected steel materials are controlled to be not bigger than −0.23V on comparing to a voltage of a standard hydrogen electrode.

18. The nuclear power plant steel detecting device according to claim 1, wherein said to-be-detected steel materials comprise an uncoated steel, a Pd-coated steel, a Pt-coated steel, and an Rh-coated steel.

19. A nuclear power plant steel detecting device, comprising:
a gas mixing tube;
a hydrogen filling barrel;
an autoclave;
an electrochemical corrosion potential (ECP) analyzer; and
an electrochemical alternative-current (AC) impedance analyzer;
said gas mixing tube having a plurality of gas cylinders and a plurality of fine-tuning control valves,
said gas mixing tube having a gas inlet tube between said gas mixing tube and said hydrogen filling barrel to provide gas to said hydrogen filling barrel through said gas inlet tube,
said plurality of gas cylinders comprising a hydrogen gas cylinder, an oxygen gas cylinder, and a nitrogen gas cylinder,
each of said gas cylinders having a corresponding one of said fine-tuning control valves at an end to control gas amount flown through and connected with said gas inlet tube through the corresponding one of said fine-tuning control valves,
said hydrogen filling barrel obtaining a hydrogen water solution,
said hydrogen filling barrel having an enclosed space obtained therewithin,
said hydrogen filling barrel having a depressurizing valve group on a top end of the barrel connected with said enclosed space,
said depressurizing valve group comprising a first depressurizing valve, a second depressurizing valve, and a third depressurizing valve,
said first depressurizing valve, said second depressurizing valve, and said third depressurizing valve being respectively connected with said gas inlet tube, a first air-releasing tube, and a second air-releasing tube,
said hydrogen filling barrel having a water level monitor meter,
said water level monitor meter having an upper valve and a lower valve,
said upper valve and said lower valve being separately connected with said enclosed space,
said hydrogen filling barrel having an outlet valve at an end connected with said enclosed space,
said outlet valve being connected with a gas-liquid inlet tube to drain said hydrogen water solution in said enclosed space through said outlet valve and to provide said hydrogen water solution to said autoclave through said gas-liquid inlet tube,
said autoclave simulating an environment of nuclear power plant water chemistry,
said autoclave being sealed by a top cover having an insulated joint,
said autoclave having a containing space therewithin,
said containing space being able to be enclosed,
said containing space being connected with said gas-liquid inlet tube and said second air-releasing tube,
said autoclave having wires therewithin spot-welded with to-be-detected steel materials,
said wires penetrating through said insulated joint to reach out of said top cover of said autoclave and connected with said ECP analyzer and said electrochemical AC impedance analyzer,
said environment of nuclear power plant water chemistry in said autoclave having a pressure of 1050 Psi and a temperature of 288° C.,
water in said autoclave having a dissolved oxygen amount between 200 and 400 ppb, a dissolved hydrogen amount between 0.1 and 2 ppm, an electrical conductivity smaller than 0.1 μS/cm and a pH value between 6.5 and 7.3,
reactants in said autoclave being cycled and drained out to said hydrogen filling barrel through said second air-releasing tube,
said ECP analyzer having said to-be-detected steel materials as working electrodes to obtain ECPs of said to-be-detected steel materials,
said to-be-detected steel materials being made of stainless steel,
said ECPs of said to-be-detected steel materials being controlled to be not bigger than −0.23V on comparing to a voltage of a standard hydrogen electrode,
said to-be-detected steel materials comprising an uncoated steel, a Pd-coated steel, a Pt-coated steel and an Rh-coated steel,
said electrochemical AC impedance analyzer providing a plurality of AC signals having different frequencies to obtain characteristics of impedances of said to-be-detected steel materials to obtain coating conditions of said to-be-detected steel materials under said environment of nuclear power plant water chemistry to obtain safety of coated films of said to-be-detected steel materials,
wherein said nuclear power plant steel detecting device obtains a detecting circuit with the above comprised components to simulate a boiling water reactor (BWR) under hydrogen water chemistry (HWC) to obtain effect of preventing intergranular stress corrosion cracking (IGSCC) of said BWR by coating internal components of said BWR with precious metal film.

20. The nuclear power plant steel detecting device according to claim 19, further comprising:
a control device connected with said autoclave to detect temperature and pressure of said detecting circuit to provide safety, said control device comprising a temperature controller and a pressure detector;

wherein said temperature controller automatically switches off a heating power supply at a first alarm setting of 300° C.;

wherein said detecting circuit is automatically turned off at a second alarm setting of 310° C.

wherein said pressure detector automatically switches off said detecting circuit and opens one depressurizing valve to release vapor at a third alarm setting of 1250 Psi; and wherein said pressure detector automatically opens two depressurizing valve to release vapor at a fourth alarm setting of 1300 Psi.

* * * * *